(12) United States Patent
Yabashi et al.

(10) Patent No.: US 8,174,792 B2
(45) Date of Patent: May 8, 2012

(54) OPENING AND CLOSING MECHANISM FOR A REMOVABLE STORAGE MEDIUM RECEPTACLE

(75) Inventors: Hiroyuki Yabashi, Tokyo (JP); Noboru Yamaguchi, Tokyo (JP); Takashi Yamauchi, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 1376 days.

(21) Appl. No.: 11/792,148

(22) PCT Filed: Nov. 17, 2005

(86) PCT No.: PCT/JP2005/021147
§ 371 (c)(1),
(2), (4) Date: Jun. 1, 2007

(87) PCT Pub. No.: WO2006/085413
PCT Pub. Date: Aug. 17, 2006

(65) Prior Publication Data
US 2007/0291412 A1 Dec. 20, 2007

(30) Foreign Application Priority Data
Feb. 8, 2005 (JP) ................................. 2005-032001

(51) Int. Cl.
*G11B 23/02* (2006.01)

(52) U.S. Cl. ........................................................ 360/132

(58) Field of Classification Search .......... 720/640–644, 720/646, 647; 360/132
See application file for complete search history.

(56) References Cited

U.S. PATENT DOCUMENTS

| 5,172,362 A * | 12/1992 | Hattori et al. .................. 720/633 |
| 5,610,892 A * | 3/1997 | Choi .............................. 720/631 |
| 5,912,870 A * | 6/1999 | Kanno et al. ................... 720/643 |
| 6,421,247 B1 * | 7/2002 | Fuchimukai .................... 361/759 |

FOREIGN PATENT DOCUMENTS

| DE | 199 59 463 A1 | 6/2001 |
| EP | 0 350 509 A1 | 1/1990 |
| EP | 1 434 316 A1 | 6/2004 |
| JP | 03-291784 A | 12/1991 |
| JP | 2002-108398 A | 4/2002 |
| JP | 2004-103408 A | 4/2004 |
| JP | 2004-213999 A | 7/2004 |

* cited by examiner

*Primary Examiner* — Joseph Feild
*Assistant Examiner* — Gustavo Polo
(74) *Attorney, Agent, or Firm* — Birch, Stewart, Kolasch & Birch, LLP

(57) ABSTRACT

An opening-closing mechanism for a record medium is arranged to include a moving body moves, on which an inserting slot and a revolving door are provided; a supporting means for causing the revolving door to support by the moving body in openable and closeable manner in the form of opening in; a movement transmission means for enabling an opening and closing operation of the revolving door on condition of the movement of the moving body; and a concave space movably receives therein the moving body.

6 Claims, 7 Drawing Sheets

OPENING AND CLOSING MECHANISM FOR A REMOVABLE STORAGE MEDIUM RECEPTACLE

TECHNICAL FIELD

The present invention relates to an opening-closing mechanism for a record medium, and particularly, to an opening-closing mechanism for a record medium used for inserting and taking out a plate-like record medium such as a card.

BACKGROUND ART

Recoding media such as cassette tapes, CDs, or MDs, which are relatively bulky and easy to handle because of their bulkiness have been commanded an overwhelming majority in on-vehicle recording and reproducing units. Large geometry of these recording media to be inserted for use from an inserting slot of a main body makes relatively easy to control an inserting direction. Meanwhile, in recent years, thin small-sized plate-like media, including various card-types, is gradually used in place of these recording media.

These plate-like recording media (hereinafter referred to simply as recording media) are small one in which music information, character information, or image information is recorded, as is well known, and they have a large capacity and excellent in portability thanks to the high degree of integration of semiconductor devices. However, these recording media are small in shape and thick, and for this reason, it is hard to insert therein and take out therefrom the main body. Technologies wrestling with improvement of this defect include, e.g., a technology, which provides a record-medium receiving section, from which the record medium is dismountable, on a closed face of a door and enables a supply of the information recorded in the record medium from the record medium stored in the receiving section to the main body (see, e.g., Patent Document 1).

However, a dust-tight door at the inserting slot and a door used for accommodating the record medium, disclosed in the Patent Document, are a relatively large door, which are arranged to open outward on the front of the main body. What is more, these doors take up a large space on account of their opening-out structure and take much time until the receiving section gets to a mountable state on the grounds of their large pivot.

Meanwhile, when a record medium is used in an on-vehicle recording-reproducing unit, a special attention must be paid to dustproof, electrostatic, and liquid inclusion. Therefore, when the record medium is taken out therefrom through the inserting slot, the provision of a revolving door on the inserting slot is indispensable.

Patent Document 1: JP-A2002-108398

The conventional recording-reproducing unit has been arranged such that the record medium is received in the door itself, which opens and closes; the door is designed to open outward from a front side of the main body; and the record medium cannot be inserted therein or taken out therefrom until the door is opened. Thus, there has been apprehensive of that a much operating time may be taken for insertion and take out of the record medium.

The present invention has been made to solve the above-mentioned problems, and an object of the present invention is to provide an opening-closing mechanism for a record medium, while preventing an invasion of foreign matters through the inserting slot, enables the record medium to be readily and promptly inserted therein and taken out therefrom.

DISCLOSURE OF THE INVENTION

The opening-closing mechanism for a record medium according to a first aspect of the present invention is arranged such that a revolving door is provided at an inserting slot for inserting a plate-type record medium to normally close thereof, wherein the opening-closing mechanism for the record medium comprises a moving body that is provided with a revolving door and moves between the front side of an exterior portion thereof and a record-medium holder with an insertion of the record medium through the inserting slot in inserting the record medium in the record-medium holder disposed at the back of the inserting slot; a supporting means for causing the revolving door to support by the moving body in openable and closeable manner in the form of opening in; a movement transmission means for enabling an opening-closing operation of the revolving door on condition of the movement of the moving body; and a concave space movably receiving therein the moving body.

According to a second aspect of the present invention, it provides an opening-closing mechanism for the record medium, while preventing an invasion of foreign matters through the inserting slot, allows a rapid and prompt insertion and take out of the record medium through the inserting slot.

BEST MODE FOR CARRYING OUT THE INVENTION

Embodiments of the present invention will now be described with reference to the accompanying drawings for describing the present invention in more detail.

First Embodiment

Figure 1:
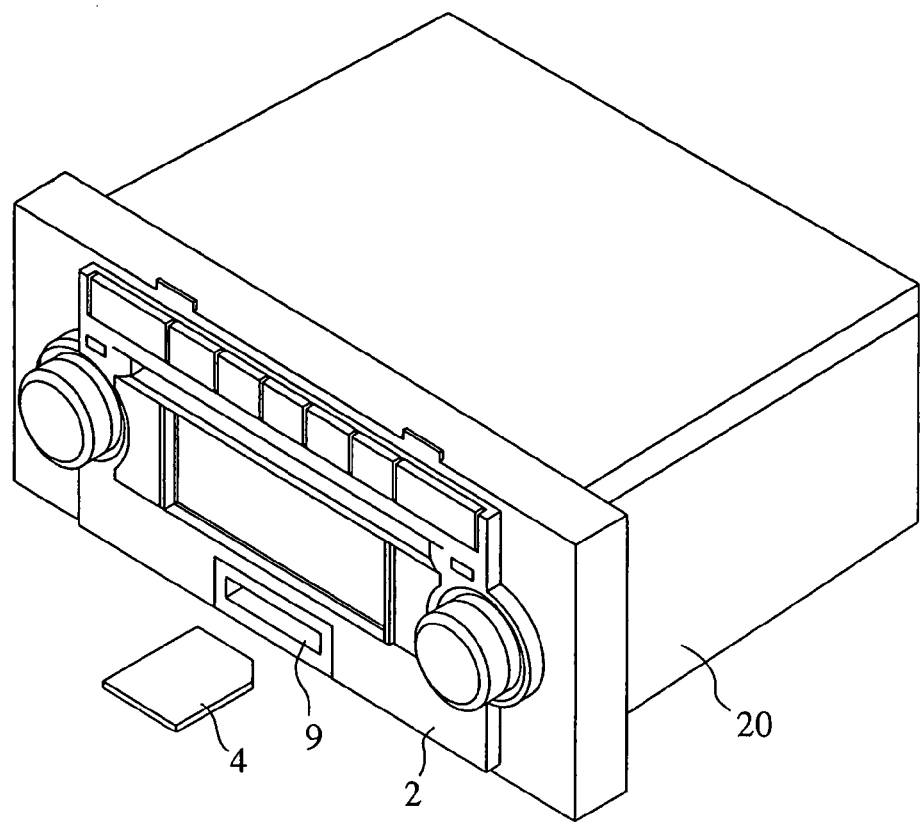
FIG. 1 is an external oblique view of an appliance using a card-type record medium.
Figure 2:
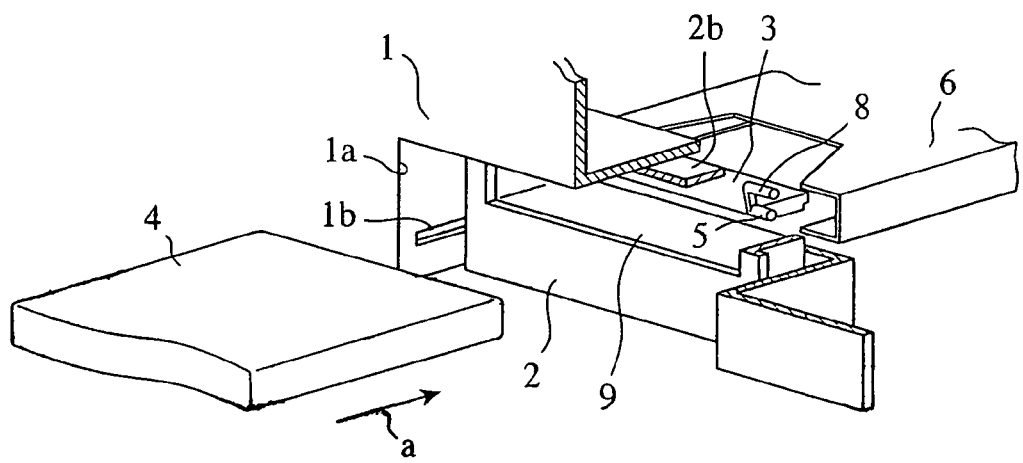
FIG. 2 is a partial cross-sectional oblique view explaining an internal structure of a design panel.

Referring to FIG. 1, an audio unit 20 is shown as one example of on-vehicle appliances. An inserting slot 9 for inserting therein a card-type record medium 4 is formed on the front of the audio unit 20 as one example of plate-type recording media. Referring to FIG. 2 illustrating, in a partial cross-sectional oblique view, a peripheral arrangement around the inserting slot 9, a design panel 1 constitutes an exterior portion of the audio unit 20.

A rectangular opening 1a is formed on the front of the design panel 1. This rectangular opening 1a is deep, within which a concave space movably receives therein a casing-shaped moving panel 2 as a moving body in the depth direction indicated by an arrow a.

An elongate inserting slot 9 for inserting therethrough the card-type record medium 4 is formed on the front of the design panel 1. On the inner side of the inserting slot 9, indicated by an arrow a, is provided with a card holder 6, serving as a record-medium holder, for inserting the card-type record medium 4. The card holder 6 is integrally secured to the design panel 1 through a substrate 12.

Figure 3:
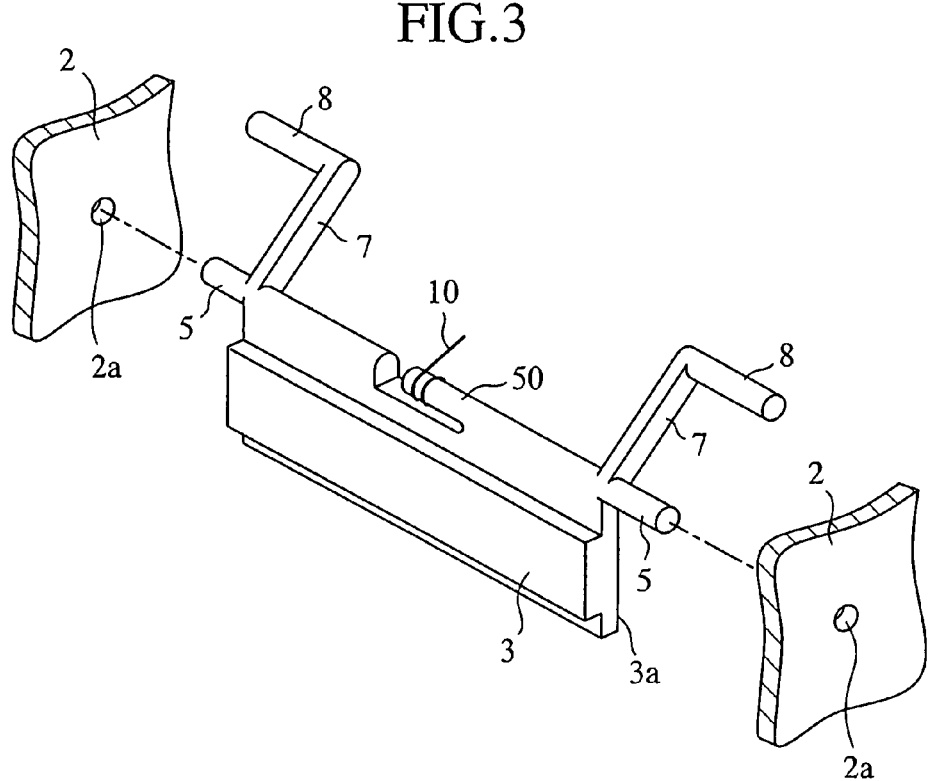
FIG. 3 is an oblique view of a revolving door.

A rectangular plate-shaped revolving door 3 is positioned to a transversely elongated lower edge of the inserting slot 9 with its lengthwise aligned. The revolving door 3 has a pivot 5 at lengthwise both ends thereof as shown in FIG. 3; further, a link lever 7 having its basal end on a neighboring portion of the pivot 5 extends therefrom; and another pivot 8 parallel to the pivot 5 is provided on the end of the link lever 7. Here, the link lever 7 is formed in position bent in the shape of dogleg to the back 3b of the revolving door 3.

Figure 7:
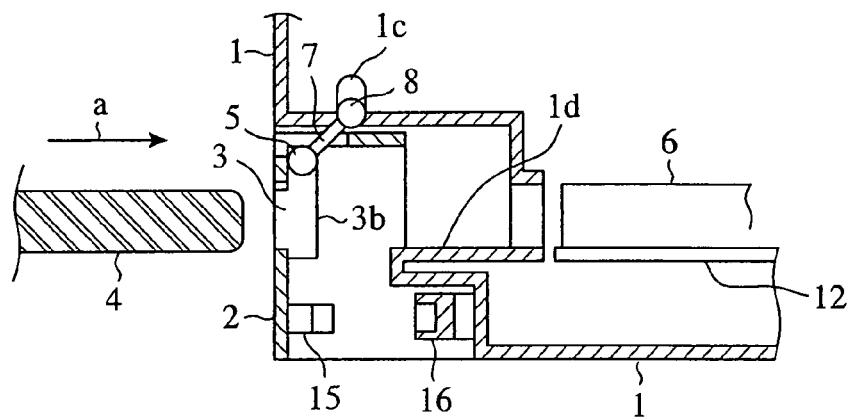
FIG. 7 is a view explaining an inserting process of the record medium.
Figure 8:
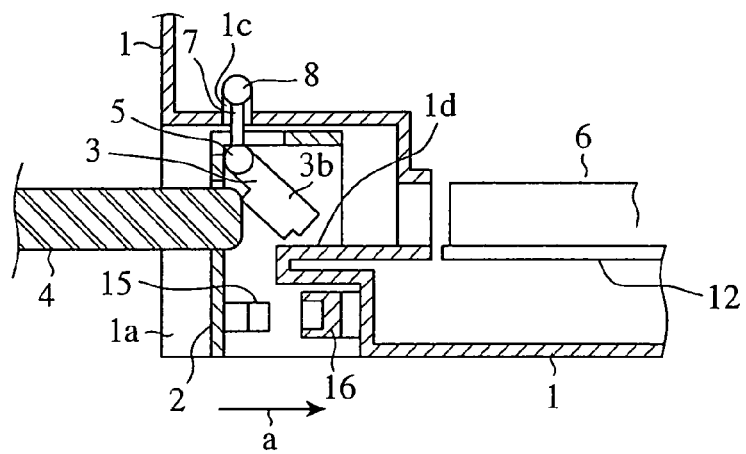
FIG. 8 is a view explaining an inserting process of the record medium.
Figure 9:
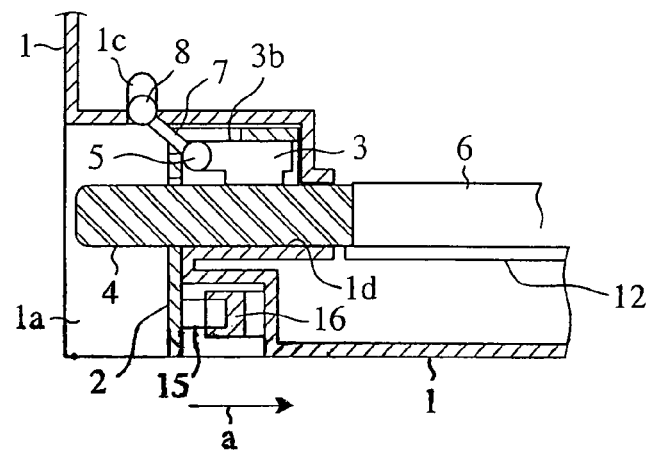
FIG. 9 is a view explaining an inserting process of the record medium.

The two axes 5 are inserted into a hole 2a formed through the moving panel 2, and are rotatably supported by the hole. The axes 5 are located at the back of the moving panel 2 above and in the vicinity of an upper edge of the inserting slot 9. Thereby, the revolving door 3 is arranged to open inward. The axes 5 and the hole 2a supporting the axes constitute a supporting means for causing the revolving door 3 to support in openable and closeable manner the moving panel 2 in the form of opening in. The revolving door 3 is of such a size enough to cover the inserting slot 9, and is designed to open inward as also shown in FIG. 7 to FIG. 9 described later, thus preventing an invasion of dust and foreign matters by tightly closing the inserting slot in the closing state.

Figure 4:
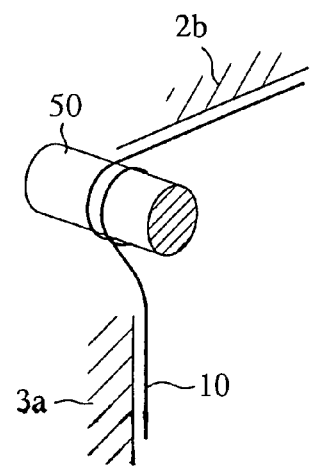
FIG. 4 is an oblique view explaining a mounting aspect of a torsion spring.

As shown in FIG. 3, a pivot portion 50, which is concentric with the pivot 5 is formed on a lengthwise center of the revolving door 3, and a straddle-type torsion spring 10 is attached to the pivot portion 50. As shown in FIG. 4, one end of the torsion spring 10 is pressed against an upper plate 2b (see FIG. 2) integrally formed with the moving panel 2, and the other end of the torsion spring 10 is pressed against a back 3a of the revolving door 3.

Thereby, the torsion spring 10, of which one end is pressed down by an immovable upper plate 2b, presses a free end side of the revolving door 3 to normally close the revolving door 3 in the form of opening in. The revolving door 3 thus arranged to open inward, allows pushing and moving the revolving door 3 to open the inserting slot 9 with an insertion of the card-type record medium 4 through the inserting slot 9.

Figure 5:
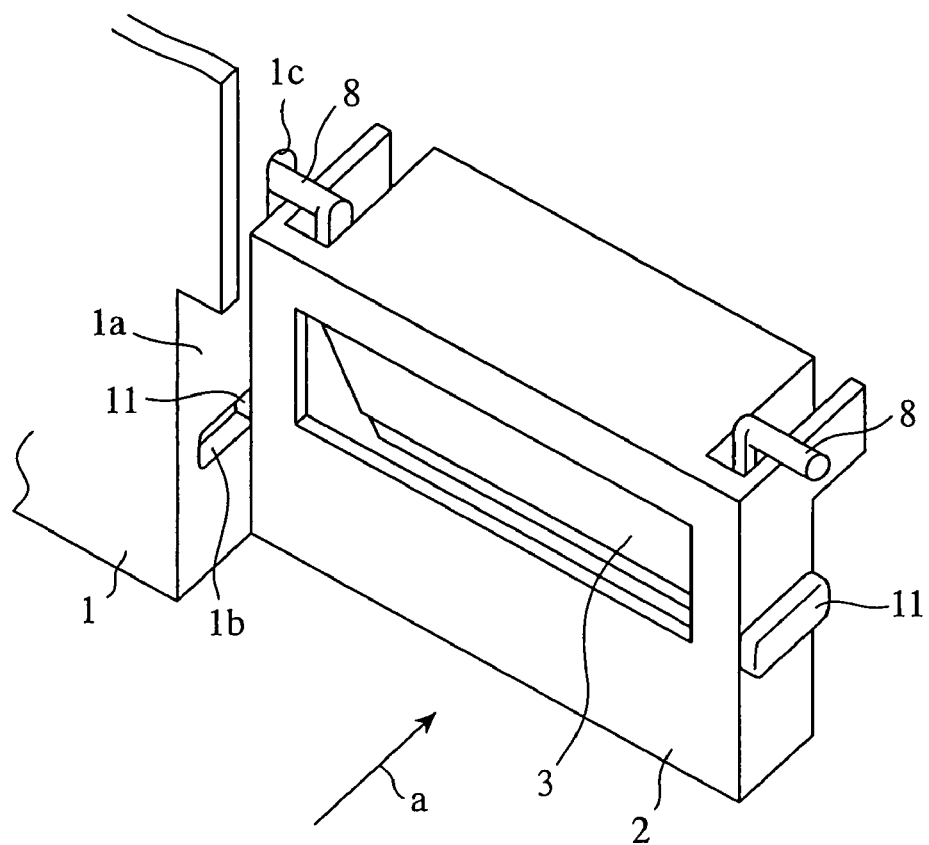
FIG. 5 is an oblique view of a moving panel and its peripheral members.

As shown in FIG. 5, a protuberant portion 11 is formed on the opposing both sides of the moving panel 2 in a direction parallel to the direction indicated by an arrow a. Moreover, a groove 1b, which fits to the protuberant portion 11 to restrict a moving direction of the moving panel 2 in the direction of the arrow a, is formed on the face of the exterior portion 1 that forms the concave space communicating with the opening 1a. These protuberant portion 11 and groove 1b constitute a guide means for guiding the moving panel 2 in the direction of the arrow a (in a rectilinear direction).

Thus, the moving panel 2, provided with the inserting slot 9 and equipped with the revolving door 3, can move between the front side of the design panel 1 serving as an exterior portion and the card holder located on the inner side of the inserting slot 9.

Referring to FIG. 3 and FIG. 5, the pivot 8 movably fits to a longitudinally elongated hole 1c formed on the sides of the design panel 1. Such an arrangement restrains the moving panel 2 from freely moving, in company with the guide means (protuberant portion 11 and the groove 1b).

As described above, as shown in FIG. 7 to FIG. 9, the link lever 7 is formed in position bent in the shape of dogleg with respect to the back 3b of the revolving door 3.

The linkage mechanism constituted by the axes 5 and 8 located at the both ends of the link lever 7; and the supporting portion of these axes; and the guide means (protuberant portion 11 and the groove 1b) constitute a movement transmission means for enabling an opening-closing operation of the revolving door 3 on condition of the movement of the moving body.

In the absence of the movement transmission means, even if the revolving door 3 could be pushed and opened against elasticity of the torsion spring 10 by means of the card-type record medium 4, this action does not necessarily mean the movement of the moving panel 2. The provision of the movement transmission means ensures that the moving panel 2 moves when the revolving door 3 is pushed and opened.

Figure 6:
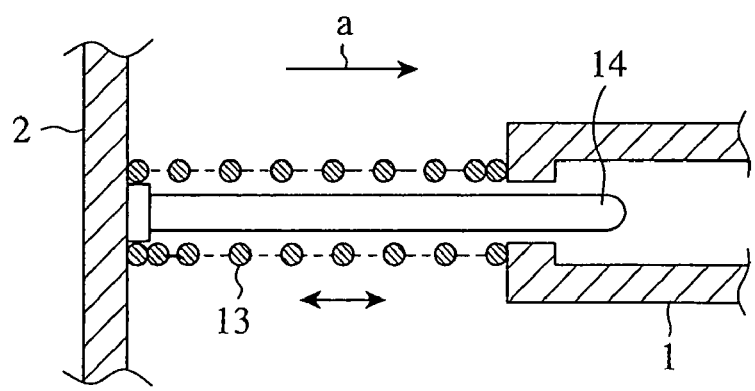
FIG. 6 is a partial cross-sectional view explaining a mounting aspect of the spring.

As shown in FIG. 6, an extensible spring 13 can be interposed between the moving panel 2 and the exterior panel 1. That is, a spring-supporting stem 14 is implanted in the moving panel 2 in the direction of the arrow a, and the spring-supporting stem is inserted into the exterior panel 1. Further, the spring 13 is wound around the spring-supporting stem 14. The moving panel 2 is always urged by a force inversely moving relative to the direction indicated by the arrow a (by a force against the force in the direction along which the card-type record medium 4 is inserted through the inserting slot 9) by elasticity of the spring 13.

Furthermore, it is arranged that the movement of the moving panel 2 by elasticity or by the torsion spring 10 is impeded by a stopper (e.g., the end of the groove 1b). Remark parenthetically, when the torsion spring 10 is provided here, it does not have to provide any arrangement associated with the spring 13.

The obstructed state of the moving panel 2 described above, is an initial state diagrammed in FIG. 7. Hereinafter, an inserting operation of the card-type record medium 4 will now be described with reference to FIG. 7 to FIG. 9.

Referring to FIG. 7, the card-type record medium 4 is in uninserted state, and the stopper acts such that the front (left end face in FIG. 7) of the design panel 1 is flush with the front (left end face in FIG. 7) of the moving panel 2, thus maintaining a surface in a projection-less flat state. Further, the revolving door 3 is in the closed state, and the exterior thereof is flush with the front of the moving panel 2 (left end face in FIG. 7). The pivot 8 is located beneath the lower portion of the elongated hole 1c.

Referring to FIG. 8, an insertion of the card-type record medium 4 is initiated by moving the record medium in the direction indicated by the arrow a toward the revolving door 3 and by pushing the revolving door 3. This inserting operation of the card-type record medium 4 causes the revolving door 3 to rotate on the pivot 5, move simultaneously therewith the pivot 8 along the elongated hole 1c through the link lever 7, and move interlocking therewith the moving panel 2, under guidance of the guide means (protuberant portion 11 and groove 1b), toward the card holder 6 disposed on the inner part thereof. In other words, the movement of the moving panel 2 is occurred synchronously with an opening operation of the revolving door 3.

Forcing the card-type record medium 4 to insert in the inserting slot 9 further opens the revolving door 3, and the movement of the moving panel 2 gradually inserts the card-type record medium 4 in the card holder 6. In this process, due to a wall thickness of the revolving door 3, its end of the revolving door having this wall thickness, presses the top of the card-type record medium 4 by an urging force of the torsion spring 10, to thereby push the lower face of the card-type record medium 4 against the guiding top 1d of the design panel 1, thus serving as a guide responsible for stabilization of an attitude of the card-type record medium 4 at the time of insertion of the record medium.

In this way, when the card-type record medium 4 pushes and opens the revolving door 3 to go in the inserting slot 9, the card-type record medium 4 is pressed by elasticity of the torsion spring 10 serving as an urging means for normally closing the revolving door, which restricts an admission path and smoothly inserts the record medium therein. coincidently, because the card-type record medium 4 is in the pressed state by elasticity of the coil spring 10, it is free from care of generation of a chattering vibration in the state in which an insertion of the card has been completed.

Moreover, referring to FIG. 9, when the card-type record medium 4 is pushed in the card holder 6 until the rear end of the card-type record medium 4 gets to a state in which the rear end thereof does not protrude from the front of the exterior panel 1, the card-type record medium 4 is held in the card holder 6 by the means provided incidental on the card holder 6.

Thus, the card-type record medium 4 can maintained at a position where the rear end of the card-type record medium 4 does not protrude from a flat face of the design panel 1, with the recording media being inserted, which realizes an arrangement compliant with the European law associated with on-vehicle appliances. Hitherto, when inserting a card-type record medium in an on-vehicle appliance, it has been thought as being desirable to provide the card inserting slot with an opening-closing door as a countermeasure against dust, static electricity, and an invasion of liquid; however, the conventional arrangement is encountered with a difficulty in an inserting and extracting operation to insert the card-type medium 4 in the inner part thereof, resulting from the arrangement where a card-holder is disposed at the inner part to reserve a space for opening and closing the opening and closing operation door.

In this respect, according to the first embodiment, the moving panel 2 is moved to bring the opening 1a into the closed state, which makes it possible to form the circumference of the inserting slot 9 so as to have a width enough to grasp the card-type record medium 4 within a concave space open to the opening 1a. In other words, in FIG. 9, a space corresponding to the opening 1a is formed in the vicinity of the rear end of the card-type record medium 4 within the range where the moving panel 2 is moved, thus reserving an ample space enough to pinch and draw out the card-type record medium 4.

Where such an arrangement concerning the spring 13 diagrammed in FIG. 6 is left out, once retention of the card-type record medium 4 with the card holder 6 is released by taking out the card-type record medium 4, the moving panel 2 and the revolving door 3 revert to the initial state shown in FIG. 7 by repulsion of the torsion spring 10.

Conversely, where such an arrangement is provided to the spring 13 depicted in FIG. 6, the torsion spring 10 is not necessarily required. Using with an well-known push/push-type latch mechanism releases the latch by pressing the moving panel 2 on a finger under the condition shown in FIG. 9, and the moving panel 2 and the revolving door 3 revert to the initial state shown in FIG. 7 by repulsion of the spring 13. The card-type record medium 4 is drawn out from the card holder 6 together with the moving panel 2 and is moved, projecting outward from the design panel 1. Thereafter, one pinches and takes out the record medium.

Figure 10:
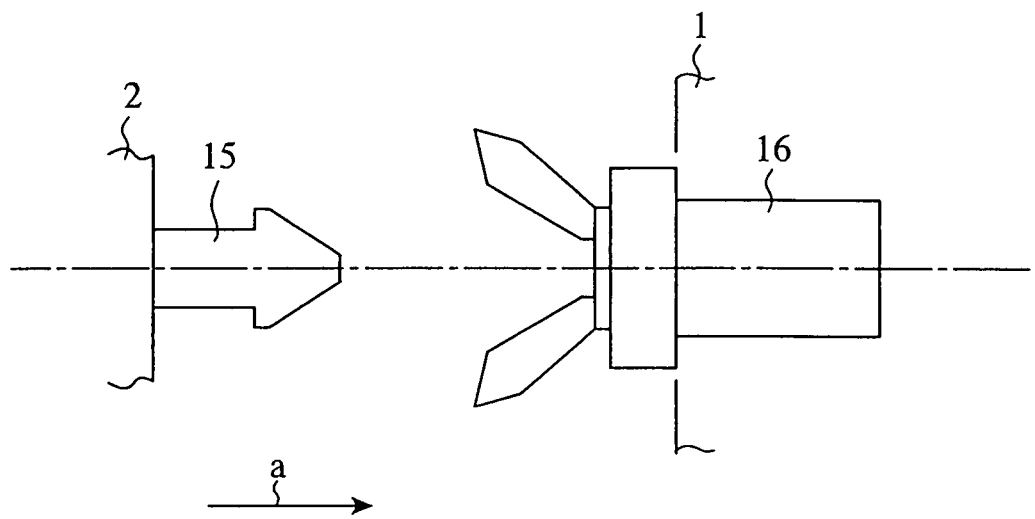
FIG. 10 is a schematic front view of a pair of latch mechanisms.

The above-described latch mechanism, as illustrated in FIG. 10, is arranged such that an engaged member 15 is provided, e.g., on the moving panel 2 side, and an engaging member 16 is provided on the immobile design panel 1 side, which holds the engaged member 15. Exemplary disposition of these engaged member 15 and engaging member 16 are shown in FIG. 7 to FIG. 9, for reference. Naturally, it may also be possible to provide a torsion spring 10 with it overlying each other, in the case where the spring 13 and the latching mechanism are provided therein. In this case, as described above, an urging force of the torsion spring 10 implements a pressing function in time of insertion of the card-type record medium 4.

Figure 11:
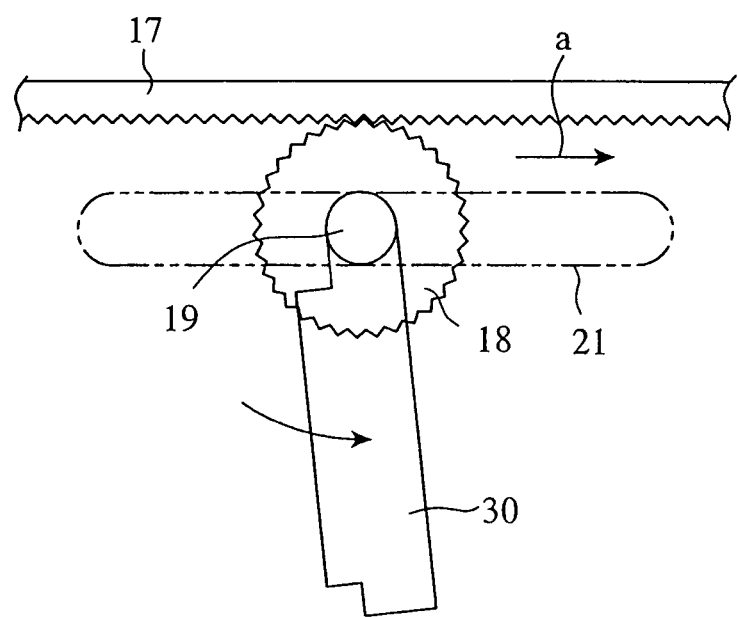
FIG. 11 is a front view of a rack and a pinion mechanism illustrating a movement transmission means.
Figure 12:
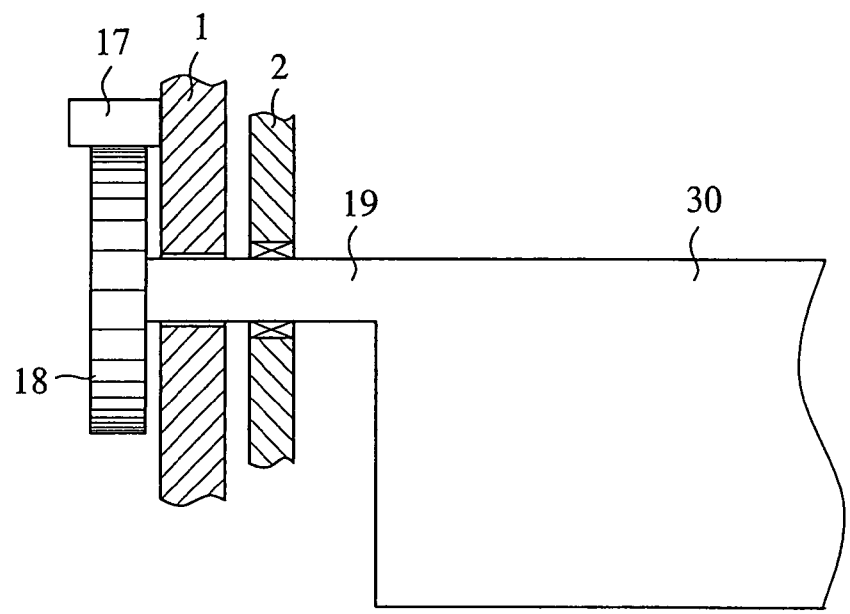
FIG. 12 is a partial cross-sectional side view of a rack and a pinion mechanism illustrating the movement transmission means.
Figure 13:
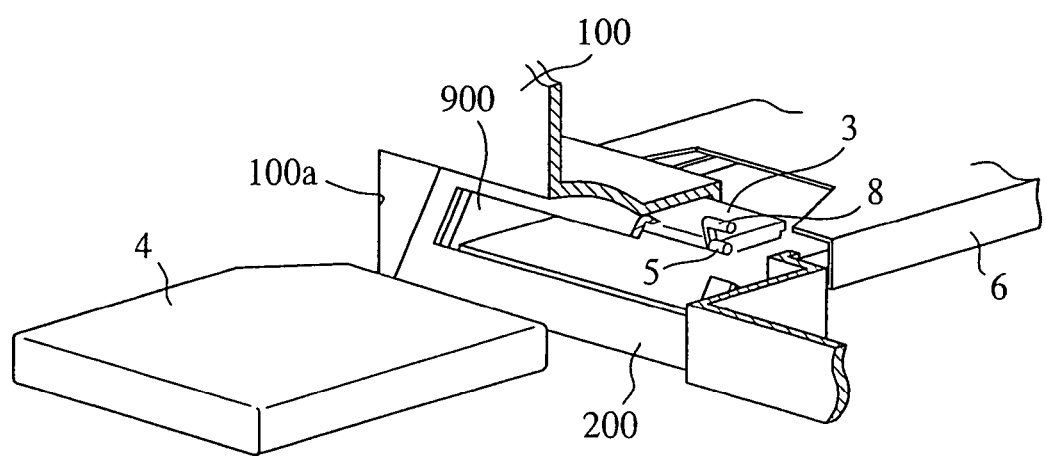
FIG. 13 is a partial cross-sectional oblique view explaining an internal structure of a design panel.

While the movement transmission means can be arranged by the linkage mechanism as exemplified, instead thereof, the movement transmission means may also be arranged, e.g., by a rack and a pinion, as shown in FIG. 11 and FIG. 12. In this case, an elongated rack 17 is provided in the direction of the arrow a integrally with the design panel 1, and a pinion 18 is geared with the rack 17. A pivot 19 integrally formed with the pinion 18 is also integrally done with a revolving door 30; the pivot 19 is inserted into the moving panel 2 to axially support the inserting portion; and further into the design panel 1. Upon this, the inserting portion shall be the elongated hole 21 formed in the direction of the arrow a.

Second Embodiment

The second embodiment takes an arrangement in which the moving body (moving panel 2) does not perform a rectilinear motion, as illustrated, but merely swing on a fulcrum pivot. The arrangement except this respect is common to that of the first embodiment described above. Thus, in FIG. 13 to FIG. 16, the revolving door 3 has the same arrangement as that of the first embodiment, and therefore, its description is made with the same reference numerals. This also holds true for the other members having a similar function thereto, a description will be made with the same reference numerals, unless they lead to confusion.

A design panel 100 constituting an exterior portion of the audio unit 20 shown in FIG. 1 is provided with a revolving panel 200 serving as a moving body, which swings on a fulcrum pivot 100b toward an inner side of an opening 100a. The pivot 5 is axially supported by the revolving panel 200, and the pivot 8 provided through the link lever 7 is engaged in an elongated hole 100c formed through the design panel 100.

The revolving door 3 is urged by repulsion of a spring (not shown) (e.g., a spring rotating the revolving panel 200 on the fulcrum pivot 100b in a counterclockwise direction in FIG. 1) so as to cover an inserting slot 900 formed through the revolving panel 200, and the rotation of the revolving door 3 caused by the urging force is impeded by a stopper (not shown).

Figure 14:
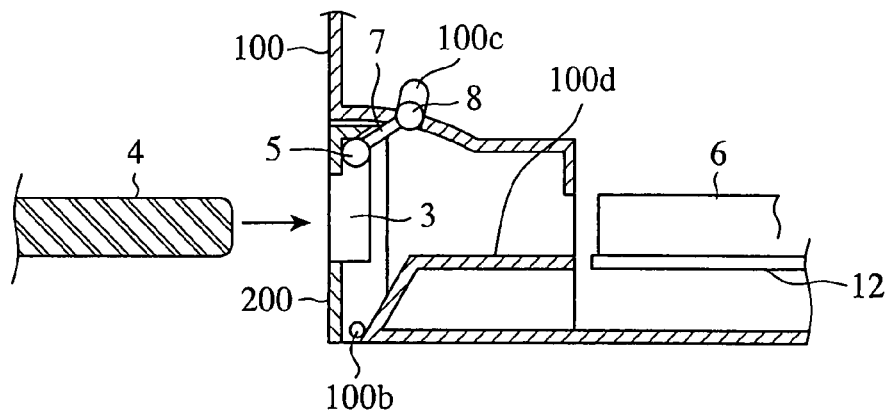
FIG. 14 is a view explaining an inserting process of the record medium.

In the initial state in which a card-type record medium 4 is not yet inserted therein, the inserting slot 900 is closed, as shown in FIG. 14, by the revolving door 3 in the form of opening in. The revolving door 3 covers the opening 100a, thus maintaining the front of the design panel 100 in a flat state.

The inserting operation of the card-type record medium 4 will now be described with reference to FIG. 14 to FIG. 16.

In FIG. 14, the card-type record medium 4 is in an uninserted state, and the stopper acts such that the front (left end face in FIG. 14) of the design panel 100 is flush with the front (left end face in FIG. 14) of the moving panel 200, thus maintaining the surface thereof in a projectionless flat state. Further, the revolving door 3 is in a closed state, and an external face thereof is flush with the front of the revolving panel 222 (left end face in FIG. 14). The pivot 8 is located at a lower portion of the elongated hole 100c.

Figure 15:
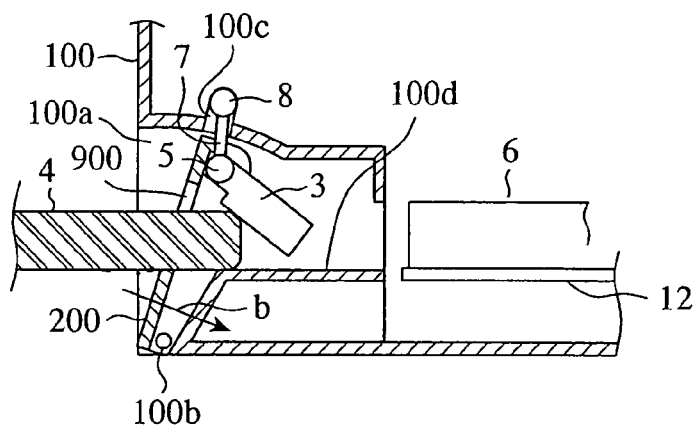
FIG. 15 is a view explaining an inserting process of the record medium.

In FIG. 15, an insertion of the card-type record medium 4 is initiated by moving the card-type record medium in the direction indicated by the arrow a toward the revolving door 3 and by pushing the revolving door 3. This inserting operation of the card-type record medium 4 causes the revolving door 3 to rotate on the pivot 5, simultaneously therewith, causes the pivot 8 to move along the elongated hole 100c through the link lever 7, and interlocking therewith, causes the revolving panel 200 to swing on the fulcrum pivot 100b toward the card holder 6 disposed on an inner side thereof. In other words, a movement of the revolving panel 200 is synchronized with an opening operation of the revolving door 3.

Pushing the card-type record medium 4 into the slot 900 further opens the revolving door 3, and swinging the revolving panel 200 gradually inserts the card-type record medium 4 in the card holder 6. In this process, the revolving door 3 has a wall thickness, and thereby, the end of the revolving door presses the top of the card-type record medium 4 in the direction indicated by the arrow b by an urging force of the spring to push a face of the card-type record medium 4 against a guide face 100d of the design panel 100, thus serving as a guide stabilizing an attitude of the card-type record medium 4 in time of insertion of the record medium.

Figure 16:
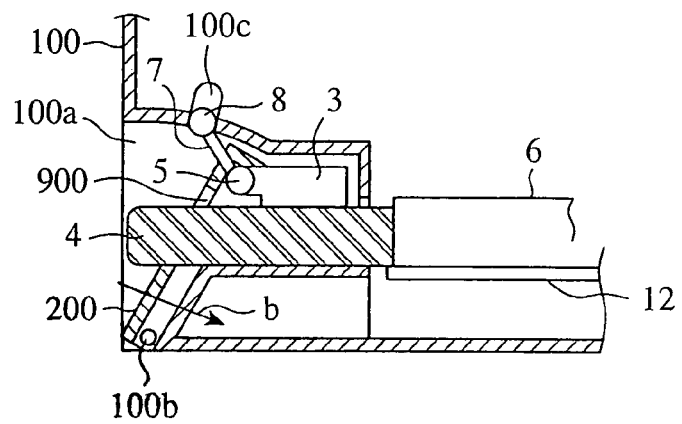
FIG. 16 is a view explaining an inserting process of the record medium.

When the card-type record medium 4 thus pushed the revolving door 3 to go into the inserting slot 900 and the card-type record medium 4 is pushed in the card holder 6 until a rear end of the card-type record medium 4 gets to a the state in which the rear end thereof is not extruded from the front of the design panel 100 in FIG. 16, the card-type record medium 4 is held in the card holder 6 by a means incident to the card holder 6.

Thus, the card-type record medium 4 can be held at a position at which the rear end of the card-type record medium does not extrude from the flat face of the design panel 100, with the recording media inserted in the card holder, which may make this arrangement compliant with the European law concerned with on-vehicle appliances. In FIG. 16, a space corresponding to the opening 100a is formed around the rear end of the card-type record medium 4, within the range where the revolving panel 200 is swayed, which secures an ample space wide enough to pinch and draw out the card-type record medium 4.

It should be appreciated that, in the first and second embodiments, the vertical direction, as viewed in the figures, does not necessarily indicate the perpendicular direction, and one may be put into practice by setting it to a direction along the members.

INDUSTRIAL APPLICABILITY

As mentioned hereinabove, the opening-closing mechanism for a record medium according to the present invention enables the record medium to be easily and promptly inserted therein and withdrawn therefrom, while preventing an invasion of foreign matters or the like through the inserting slot, and the mechanism is suitable for use as an opening-closing mechanism for a record medium, particularly for use as an opening-closing mechanism for a record medium used for inserting therein and taking out therefrom the flat-type record medium such as a card-type record medium.

The invention claimed is:

1. An opening-closing mechanism for a revolving door provided at an inserting slot for inserting a plate-type record medium into a receiving device, the opening-closing mechanism comprising:
   a moving body disposed in the receiving device and having an opening aligned with the front of the inserting slot, the moving body being configured to move along an axis defined by an inserting direction of the inserting slot between the front side of an exterior portion of the receiving device and a record-medium holder disposed at the back of the inserting slot;
   a support for the revolving door disposed within said moving body, the support being configured to enable the door to open into the moving body, thereby revealing the opening;
   a movement transmission configured to move the moving body as a result of opening of the revolving door; and
   a concave space within the receiving device within which the moving body moves.

2. The opening-closing mechanism for a record medium according to claim 1, wherein the concave space defines an area around the inserting slot such that the defined area is wide enough for a person to grasp and extract the record medium from the record medium holder when it protrudes from the inserting slot into the concave space.

3. The opening-closing mechanism for a record medium according to claim 1, wherein the moving body is urged in a direction against a force of a direction along which the record medium is inserted therein through the inserting slot.

4. The opening-closing mechanism for a record medium according to claim 1, wherein when the record medium pushes the revolving door open and goes in the inserting slot, the record medium is held in place by a spring configured to close the revolving door when no record medium is in the inserting slot.

5. The opening-closing mechanism for a record medium according to claim 1, further comprising a guide that guides the movement of the moving body within the concave space.

6. The opening-closing mechanism for a record medium according to claim 1, wherein the moving body moves in the inserting direction by swinging on a fulcrum pivot such that a pivot-point of the moving body maintains a fixed position relative to the exterior portion while a pivoting portion of the moving body moves in the inserting direction.

* * * * *